United States Patent [19]
Zaromb

[11] 3,768,908
[45] Oct. 30, 1973

[54] REMOTE SENSING APPARATUS AND METHODS
[76] Inventor: Solomon Zaromb, 376 Monroe St., Passaic, N.J. 07055
[22] Filed: Jan. 4, 1971
[21] Appl. No.: 103,507

[52] U.S. Cl.................. 356/103, 356/75, 250/71 R
[51] Int. Cl.......................... G01n 21/00, G01j 3/44
[58] Field of Search.................... 356/103, 207, 256, 356/75; 250/71, 218, 104

[56] References Cited
UNITED STATES PATENTS
3,528,740  9/1970  Gerry et al............................ 356/75
3,566,114  2/1971  Brewer.............................. 250/71 R
3,499,159  3/1970  Carrier et al. ...................... 356/103
3,540,829  11/1970 Collinson et al..................... 356/129

OTHER PUBLICATIONS
"New Fields For Laser Raman Spectroscopy," Electro-Optical Systems Design Conf., Toman Hirschfeld, 1970.

Primary Examiner—Ronald L. Wibert
Assistant Examiner—Conrad Clark

[57] ABSTRACT

A lidar spectroscopic apparatus comprises a laser transmitter and a receiver in which the radiation return is spectranalyzed, a fluorescent target at a considerable distance from said transmitter and receiver, and means for aiming said transmitter and receiver at said fluorescent target. The presence of pollutants between the lidar system and said target is deduced from the attenuation of the radiation return at several wavelengths and/or from the Raman backscatter due to specific air pollutants.

16 Claims, 9 Drawing Figures

Patented Oct. 30, 1973  3,768,908

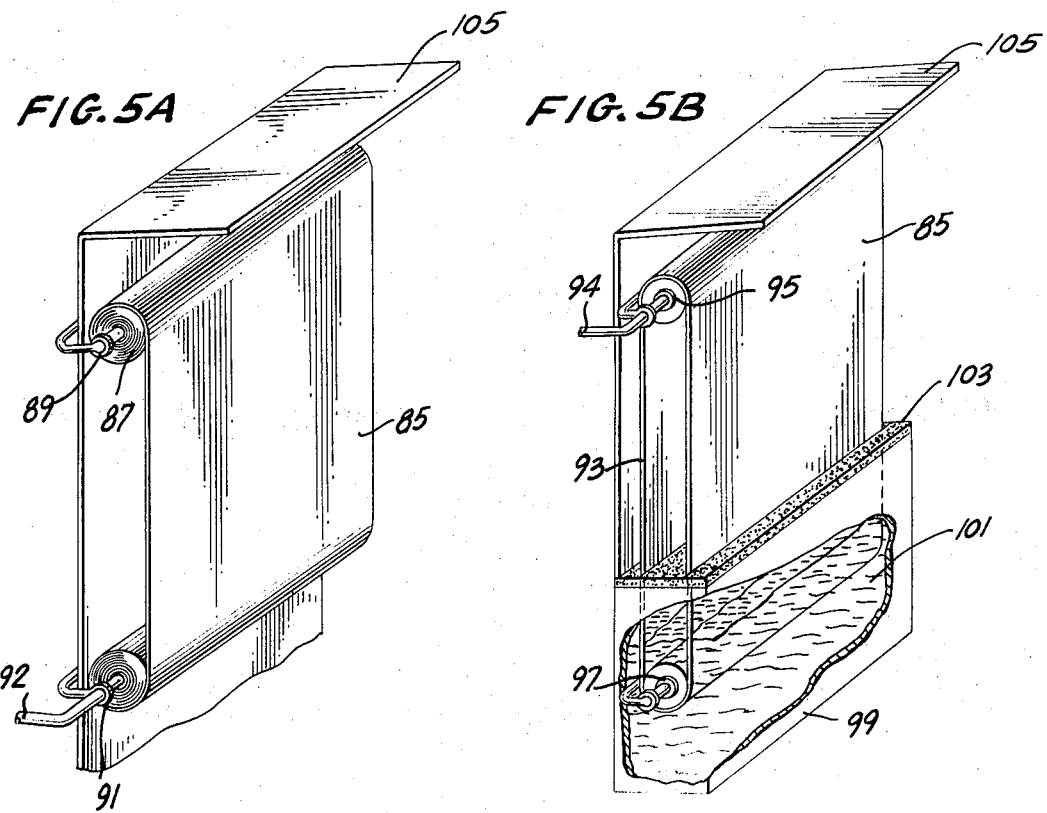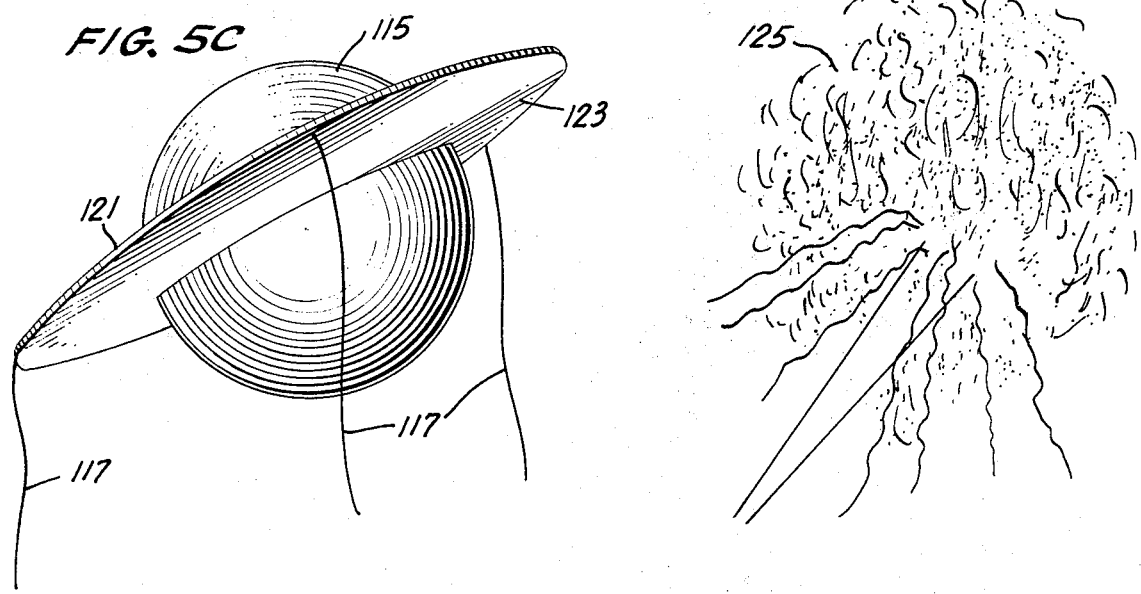

REMOTE SENSING APPARATUS AND METHODS

This invention relates to methods and apparatus for remote sensing of invisible air pollutants.

It is an object of this invention to provide optical means of detecting such commonly encountered air pollutants as sulfur dioxide, nitrogen dioxide, and ozone at considerable distances from an observation point.

It is a further object of my invention to provide such remote sensing means utilizing a relatively simple system which can be manufactured at relatively moderate cost.

It is yet another object of my invention to provide a system capable of detecting commonly encountered air pollutants in commonly encountered concentrations over distances in excess of a mile.

It is still another object of my invention to provide a means of differentiating between the various encountered pollutants, e.g., between sulfur dioxide and nitrogen dioxide, between chemical pollutants and particulate matter, and between inorganic and organic or biological types of aerosols.

My invention consists of an optical radar system capable of yielding return signals of backscattered, reflected or re-emitted radiation at a number of different wavelengths. By comparing the return signals at several wavelengths it becomes possible to identify and estimate the concentrations of the pollutants present along the path of the transmitted and of the returned radiation.

The transmitted radiation is preferably in the 0.25–0.3 micron range of ultraviolet wavelengths, such as those obtainable from the fourth harmonic of a neodymium laser or from the second harmonic of an argon-ion laser. The return signals may be provided by the Raman backscatter due to atmospheric nitrogen and oxygen and/or any other atmospheric constituents, present in sufficiently high concentration or else by a natural or artificial fluorescent background.

My invention is best explained with reference to the drawing in which.

Figure 1:
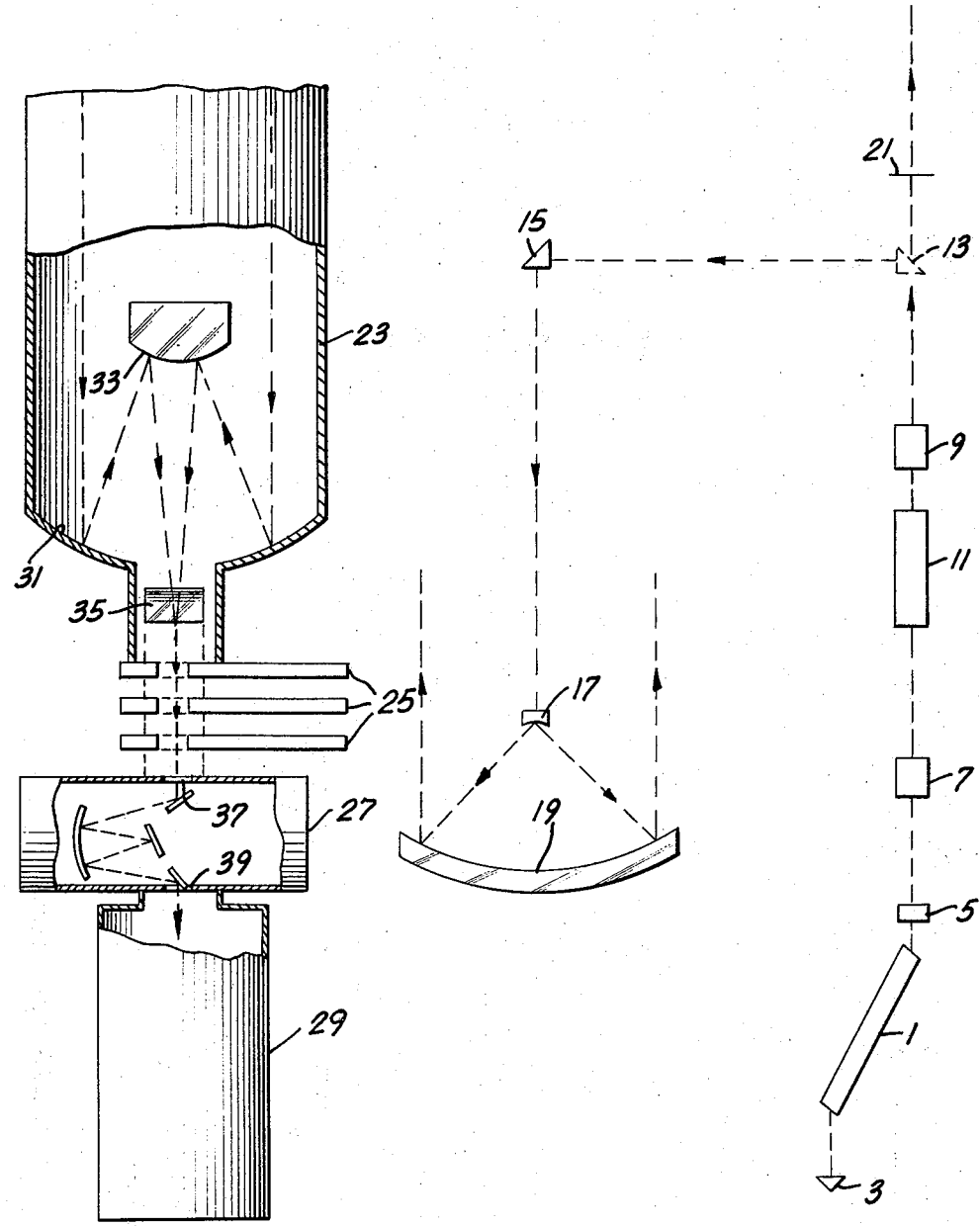
FIG. 1 is a schematic diagram of the optical system used in one embodiment of my invention.
Figure 2:
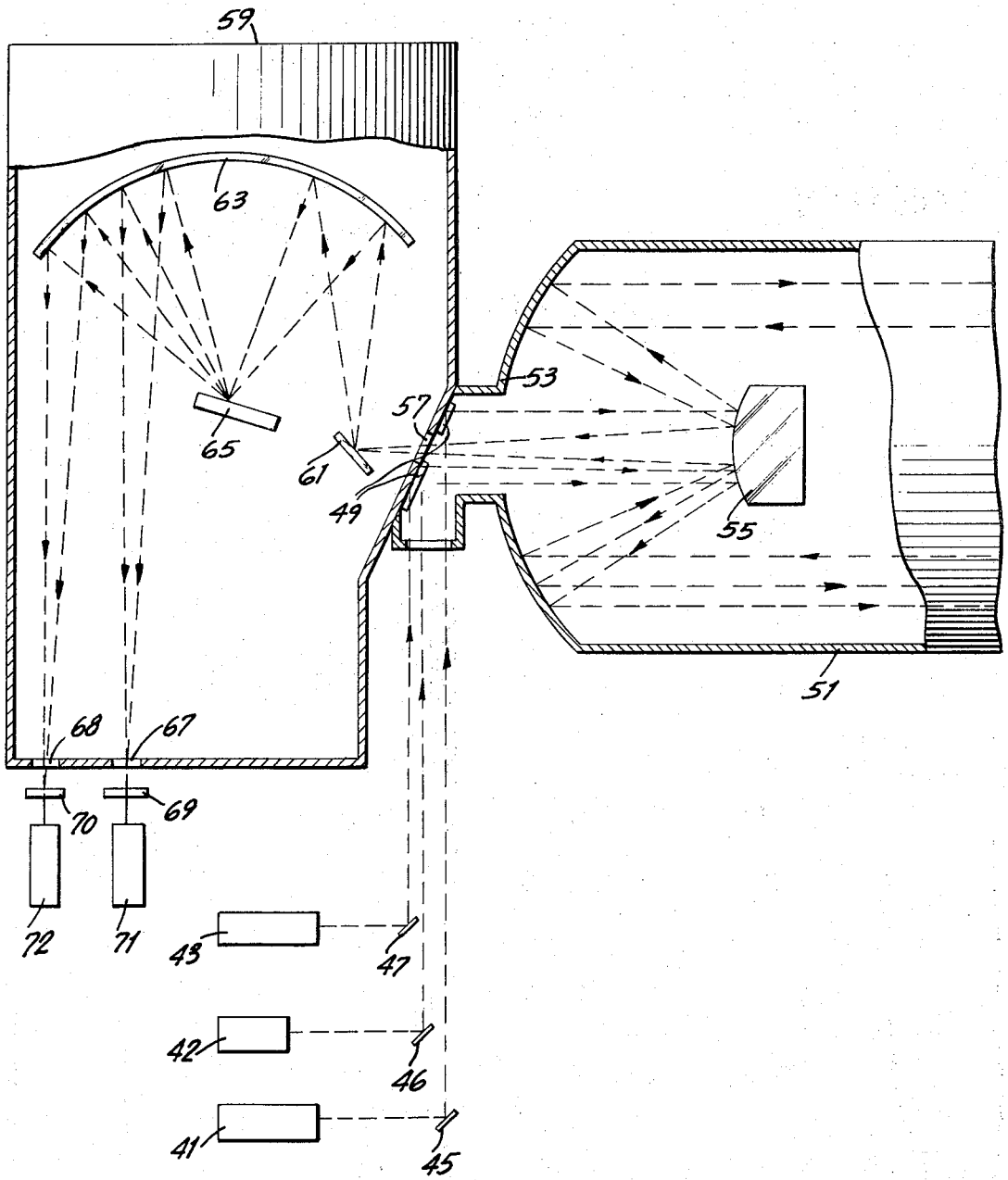
FIG. 2 is a schematic diagram of the optical system used in an alternate embodiment of my invention.
Figure 3A:
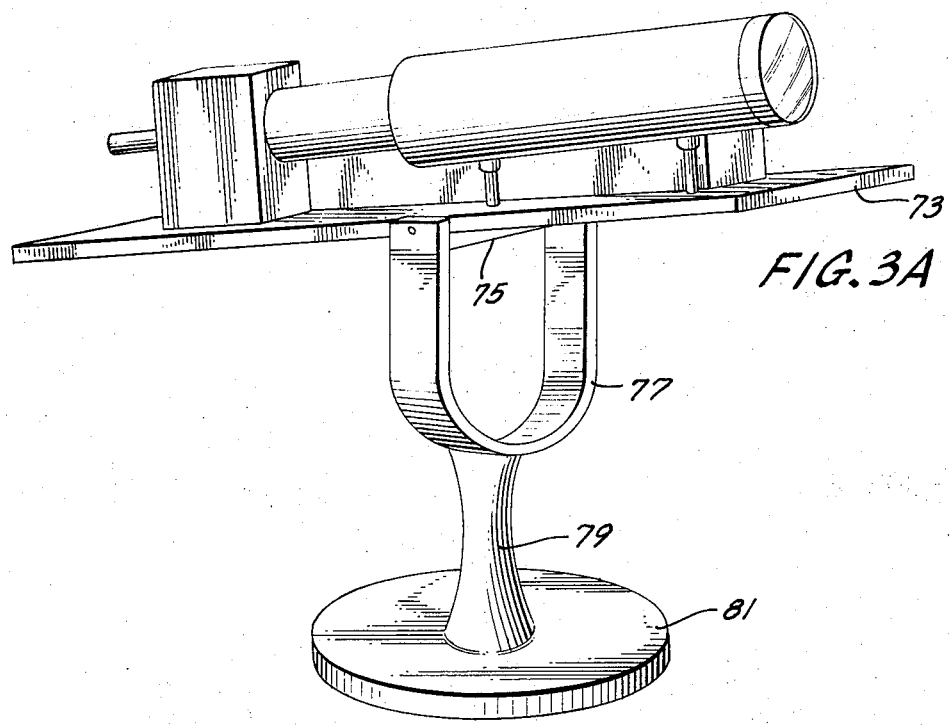
Figure 4:
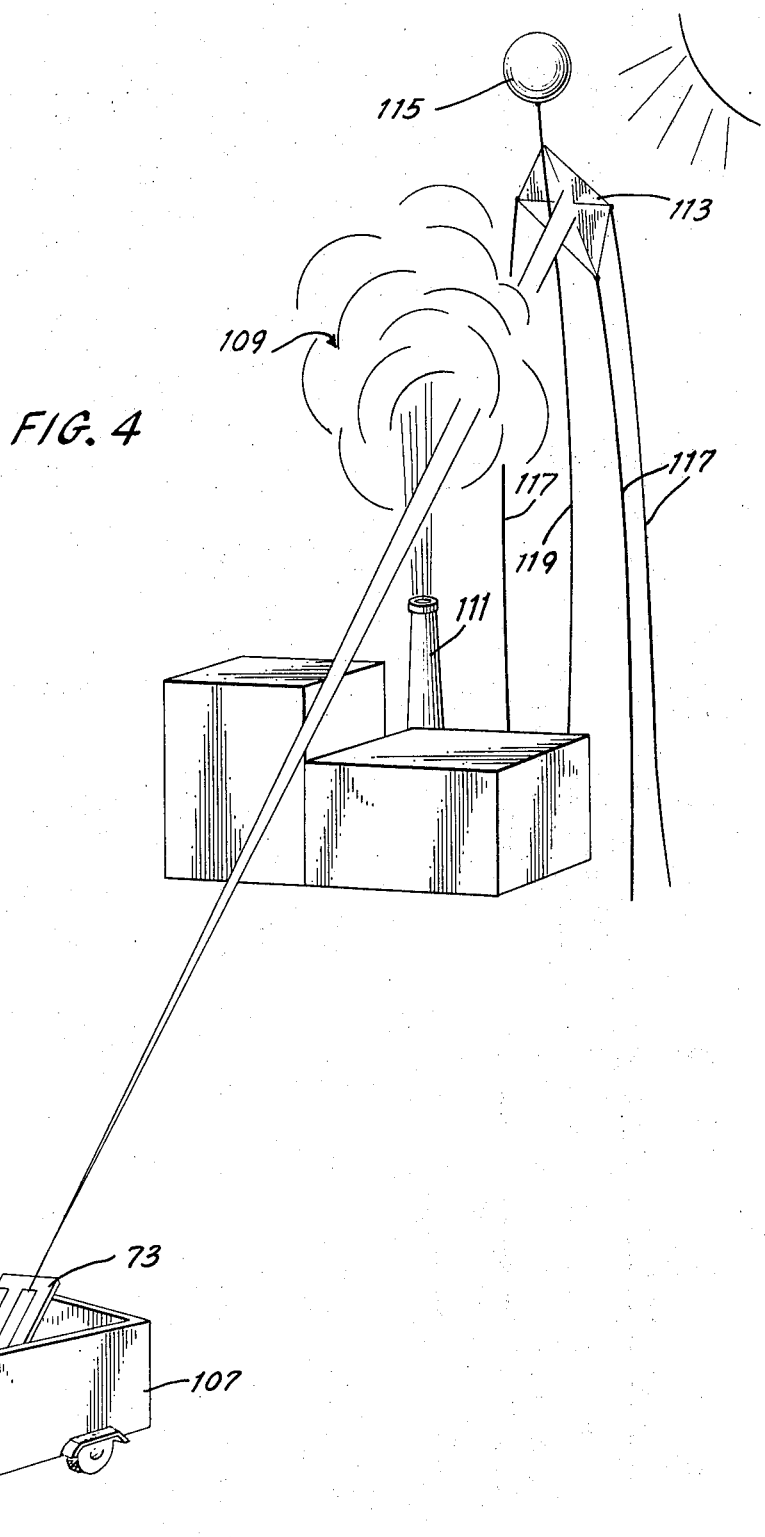

FIG. 3A and B is a schematic diagrammatic representation of one manner in which the apparatus of FIG. 1 or FIG. 2 may be applied;

FIG. 4 represents an alternate method in which the same apparatus is used; and

FIG. 5A, B, C, D is a diagrammatic representation of a few alternate ways of generating the fluorescent background used in the methods illustrated by FIGS. 3 and 4.

The optical system of FIG. 1 consists of a transmitter of intense pulses of laser radiation, on the right-hand side, and of a receiver, on the left-hand side, which collects, analyzes, and measures the radiation which is returned following transmission of a laser pulse. Each pulse is produced by a neodymium glass laser (comprising a neodymium laser head 1, a Q-switch 3, and a resonant reflector 5) which emits an intense pulse of 1.06-micron wavelength radiation in less than $10^{-7}$ second, and two successive light frequency doublers 7 and 9, also called second and fourth harmonic generators, respectively, which convert parts of the transmitted radiation into components of one half and one quarter of the original wavelength, i.e., of 0.53-micron and 0.265-micron wavelength. The harmonic generators 7 and 9 consist preferably of properly oriented and optically polished crystals of potassium dihydrogen phosphate and ammonium dihydrogen phosphate, respectively. Between them is inserted a water cell 11, containing a solution of about 1 weight-percent of copper sulfate in water along a 10-centimeter light-path, which filters out most of the original 1.06-micron radiation. A removable prism 13 may be inserted in the path of the laser beam in order to deflect said beam towards a second prism 15, which in turn deflects it towards a diverging lens 17. The latter serves in conjunction with a front-surface mirror 19 to expand the beam cross section while reducing its divergence.

This beam expansion is used only to cut down the divergence of the 0.53-micron pulses. The 0.265-micron radiation produced by the fourth harmonic generator 9 has a fairly low divergence as is, and is therefore allowed to proceed undeflected, by removing prism 13, through an ultra-violet-transmitting filter 21 which absorbs at the 0.53-micron wavelength. The transmitted beam may thus consist of either an approximately 0.1-joule pulse of 0.265-micron radiation with prism 13 removed or an approximately 1-joule pulse of 0.53-micron radiation with prism 13 in place.

The Q-switch 3 is preferably of the rotating prism type. Its rotation about a vertical axis causes the divergence angles of the laser beams to be about 10 times wider horizontally than vertically, so that the transmitted beams have a horizontal divergence angle of about 0.01 radian and a vertical divergence angle of about 0.001 radian. This approximately matches the viewing angles of the receiver, as indicated below.

The receiver comprises a Cassegrain-type telescope 23, a selection of filters mounted on independently rotatable filter wheels 25, an Ebert monochromator 27 and a photomultiplier tube 29. Most of the returned radiation incident upon the primary mirror 31 of the telescope 23 is deflected by a secondary mirror 33 through a cylindrical quartz lens 35 towards the slit 37 of monochromator 27. The latter selects radiation of a desired wavelength for measurement purposes. With a 1-millimeter slit width, the monochromator bandwidth is less than 0.002 micron. To minimize the amount of stray light passing through monochromator 27, the radiation from mirror 33 is prefiltered by a suitable selection of light filters mounted on filter wheels 25. The light transmitted through monochromator 27 is finally picked up by photomultiplier tube 29, which yields an electrical current proportional to the number of photons received.

The monochromator slits 37 and 39 are each 1 millimeter by 2 centimeters with the longer dimension approximately horizontal. The beam of radiation from mirror 33 is in the form of nearly parallel rays focusing at a distance of about 300 cm. Hence with lens 35 out of the way the viewing angles of monochromator 27 would be approximately 0.3 milliradian vertically and about 7 milliradians horizontally. The axes of curvature of the thick cylindrical lens 35 are approximately parallel to the long dimension of slits 37 and 39. The beam from mirror 33 is thus compressed vertically by lens 35 so that the viewing angle through slits 37 and 39 is increased to about 1 milliradian vertically by 7 milliradian horizontally, thus approximately matching the afore-mentioned divergence angles of the transmitted laser beams.

With the center axis of the receiver approximately parallel to and at about 10 centimeters above that of the transmitter, the wedge-shaped volumes defined by the viewing and divergence angles meet at a distance of about 100 meters from the lidar system. The latter is thus suitable for remote sensing measurements at distances in excess of 100 meters.

The afore-described apparatus combines the optical radar or lidar (light detection and ranging) technique (also called laser radar) with spectroscopy, and may therefore be briefly referred to as lidar spectroscopic apparatus.

In an alternate optical system shown in FIG. 2 the transmitter consists of several gas lasers 41, 42, 43... emitting at several different wavelengths. These may comprise an argon-ion laser with a second harmonic generator inside the laser cavity emitting 0.2573-micron radiation and/or a standard argon-ion laser emitting four or more wavelengths in the 0.4579–0.5145-micron range and/or a krypton-ion laser with a second harmonic generator inside the laser cavity emitting 0.2604-micron radiation.

The outputs of lasers 41, 42, 43,... are deflected by the respective mirrors 45, 46, 47,... toward mirror 49 which directs the laser beams into a Cassegrain telescope 51. This effectively reduces the divergence of the output beams besides bringing their emission cones into close coincidence with the field view of the receiver.

The outputs of lasers 41, 42, 43,... may be either continuous (with appropriate light choppers)or else consist of successive pulses of short duration (about 10 microseconds) at a high repetition rate. Each pulse may have a relatively low power (about 1 to 10 watts), and the beam divergence may be about 0.3 milliradian or less.

The return radiation gathered by the primary mirror 53 of telescope 51 is concentrated by the secondary mirror 55 into a nearly parallel beam of less than 1 mm cross-section passing through an aperture 57 in mirror 49. This aperture also constitutes the entrance slit into polychromator 59. The radiation entering through aperture 57 is directed by mirrors 61 and 63 onto a diffraction grating 65. The light dispersed by grating 65 is directed by mirror 63 into several exit slits 67, 68... corresponding to different measured wavelengths. Any stray light passing through slits 67, 68...may be absorbed by selective light filters 69, 70... placed in front of the respective photodetectors 71, 72...

Small portions of the emitted laser outputs backscattered from mirror 55, entering the polychromator 59, and picked up by the detectors 71, 72,... may serve to trigger the electronic circuitry as well as to measure the emitted laser pulse energies.

The electronic measurements circuitry associated with the optical systems of FIGS. 1 and 2 is rather conventional and need not be elaborated upon. It may consist of a simple oscilloscope displaying the signals from photodetector(s) 29 or 71, 72, preferably with a camera attachment for recording the oscilloscope traces. Alternately, the photodetector signals may be processed by a photon counting circuit and the information derived therefrom can be recorded on tape or on a chart-recorder, or fed into a computer, or printed out in tabular form. The various possible ways of electronically processing and recording the photodetector signals are well known to those skilled in the art, and the circuit to be used will depend on the types of measurements which are to be performed.

The applications where the afore-described apparatus may be used include monitoring the concentrations of specific air pollutants emitted from known sources, whether industrial (smokestacks, incinerators) or natural (active volcanoes, burning woods), mapping the distributions of various air pollutants in and around industrialized areas, or tracking invisible air pollutant plumes to their sources in cases of sporadic incidents of pollution of unknown origin. For the latter application the apparatus of FIG. 1 is mounted on a solid optical bench 73 (cf. FIG. 3A) supported by a beam 75 hinged on a rotatable mount 77 so that bench 73 can be swivelled to any required horizontal or vertical angle. Mount 77 rests on a pedestal 79 which is in turn affixed on one or more heavy steel plates 81 shock-mounted to the floor of the vehicle (not shown) to minimize the effects of vibrations induced in the vehicle while in motion. The apparatus is then used to estimate the relative pollutant concentrations along various directions. By following with the vehicle along the direction which indicates the highest pollutant levels it may be possible to track a pollutant plume to its source.

The methods of estimating pollutant concentrations with the apparatus of FIG. 1 comprise both lidar Raman and lidar absorption spectroscopic techniques. The Raman technique makes use of the fact that some of the light scattered by gaseous molecules differs in frequency from that of the emitted light, and the frequency difference, the so-called "Raman shift," is a characteristic property of each molecular species. The chief limitation of this technique is that the Raman-scattering intensity is usually weak, so that a rather high concentration of a given atmospheric constituent must be present to be detectible at any appreciable distance. It is thus possible to measure atmospheric nitrogen, oxygen, carbon dioxide, and water vapor, but the less concentarated constituents are usually not easily measured by this method. Nevertheless, since most industrial plumes have a rather high water and carbon dioxide content, these two substances may serve as useful tracers for the tracking of obnoxious fumes to their sources via the lidar-Raman technique.

The lidar absorption spectroscopic technique makes use of the fact that such pollutants as ozone and sulfur dioxide have strong light absorption bands in the 0.265–0.29 micron wavelength range. The transmitted fourth harmonic 0.265-micron laser pulses yield readily measurable signals at the 0.276-micron and 0.283-micron wavelengths arising from the Raman-shifted backscatter due to atmospheric oxygen and nitrogen, respectively. The second harmonic 0.53-micron pulses similarly yield Raman-shifted signals at the 0.578-micron and 0.605-micron wavelengths. Since the absorption coefficients of ozone and sulfur dioxide are well known at these four wavelengths, and there exists at least one fairly good empirical equation for estimating the atmospheric light attenuation due to aerosols and particulate matter at the same wavelengths and under various visibility conditions, it becomes possible, in principle, to separate the relative contributions of ozone, sulfur dioxide, and aerosols or particulate matter to the over-all light attenuation measured at the four wavelengths, and hence to estimate the approximate average concentrations of ozone and sulfur dioxide along a given light travel path. It may thus be possible to estimate average ozone concentrations in excess of 0.005 ppm (part per million) and/or sulfur dioxide concentrations in excess of 0.05 ppm over a distance range of 2–3 kilometers.

The main flaw of this measurement technique is that substances other than ozone and sulfur dioxide may also absorb strongly at the 0.276-micron and 0.283-micron wavelengths. The presence of such substances might then lead to erroneously high estimates of ozone and/or sulfur dioxide concentrations. Nevertheless, when one is attempting to track an otherwise invisible plume, it may not matter whether one is detecting ozone, sulfur dioxide, or another obnoxious pollutant. In either case will a higher concentration or air pollutants result in stronger attenuation of the return signals at 0.276-micron and 0.283-micron. On the other hand, the presence of relatively high concentrations of water and carbon dioxide in a plume may yield measurable Raman backscatter at 0.293 micron and at 0.274–0.275 micron. Hence a pollutant plume may be spotted by relatively weakened return signals at 0.276 micron and at 0.283 micron and by relatively enhanced signals at 0.274–0.275 micron and at 0.293 micron as compared with the return signals at the same wavelengths from relatively pure air.

The afore-disclosed relatively simple plume detection procedure arises from a fortunate combination of both afore-mentioned methods, the lidar-Raman and the absorption spectroscopic techniques. The combined use of these techniques with the same apparatus is made possible in this case by the transmission of intense laser pulses of 0.265-micron wavelength. This falls on the one hand within the wavelength transmission is where transmissionis quite acceptable through unpolluted air but where such major air pollutants as sulfur dioxide and ozone absorb strongly. Furthermore, both the Raman-scattering intensities and the photodetector sensitivity increase with decreasing wavelength thereby facilitating signal detection. The latter is also facilitated by non-interference from ambient daylight, as wavelengths shorter than 0.3 micron are removed from sunlight by the upper atmospheric ozone layer. These wavelengths are also strongly absorbed by ordinary glass windows and also by the corneal fluid of the eye, which eliminates the major hazard usually encountered with other laser systems, namely the possibility of retinal eye damage.

The afore-described measurements can, of course, be also performed with the apparatus of FIG. 2 in lieu of that of FIG. 1. The 0.2573 micron second harmonic wavelength of the argon-ion laser would then serve about the same functions as the 0.265 micron fourth harmonic wavelength of the neodymium glass laser. Each of the afore-mentioned Raman-shifted wavelengths would then be correspondingly shortened by about 0.008 micron (the difference between 0.265 micron and 0.257 micron). Alternately, the fourth harmonic of the neodymium-doped yttrium aluminum garnet (or "YAG") laser might yield approximately the same wavelengths as the apparatus of FIG. 1.

The transmitted 0.265 micron or 0.2573 micron pulses may also permit detection of several air pollutants through measurements of the resonance-Raman backscatter and/or fluorescence return of some of those substances which have absorption bands at or near the transmitted wavelength.

While the exact manner of directly exploiting the two last-mentioned effects will depend on the results of measurements of the resonance-Raman and/or fluorescence behavior of several pollutants excited by either the 0.265 micron or the 0.2573 micron laser radiation, I now proceed to disclose several ways of exploiting the well-known fluorescence of some dyes and other light absorbing substances for the detection of air pollutants by the lidar absorption spectroscopic technique.

Figure 3B:
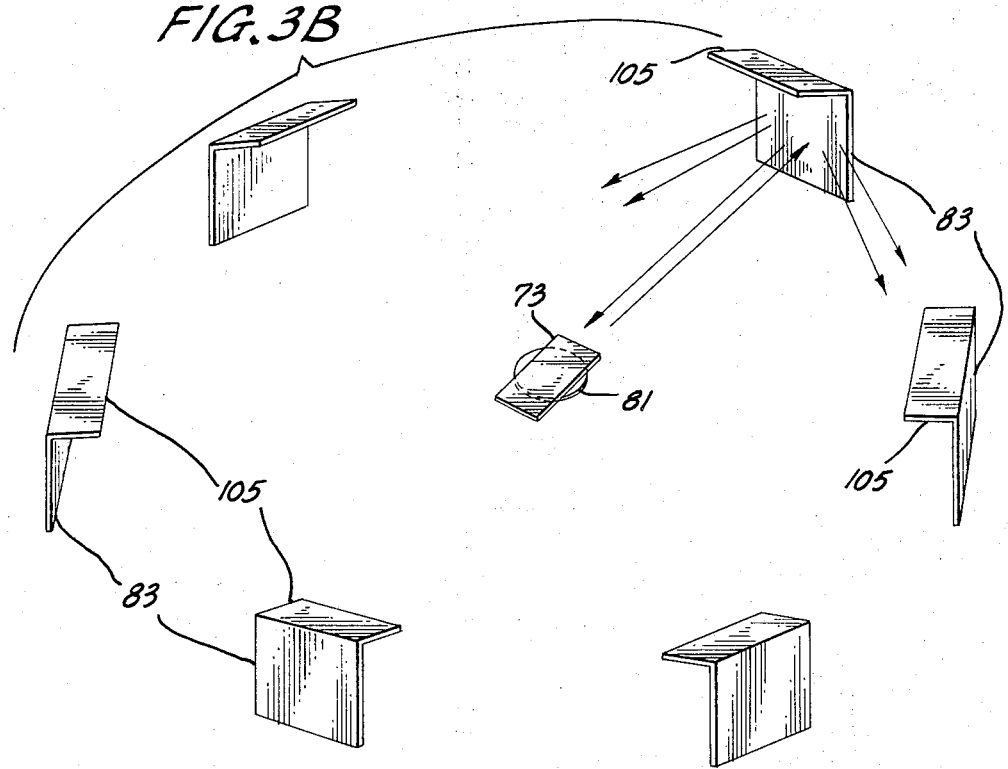

The apparatus of either FIG. 1 or FIG. 2 mounted optical opticad bench 73 as shown in FIG. 3A may be stationed at a fixed location and be successively directed at each of several targets 83, as indicated schematically in FIG. 3B. An auxiliary viewing telescope (not shown attached to optical bench 73 may be used to facilitate aiming of the lidar system at said targets. Targets 83 preferably comprise fluorescent material disposed on a target surface 85 may be provided by a disposable paper roll 87 stretched out between two rollers 89 and 91 or by an endless cloth belt 93 stretched between rollers 95 and 97, as indicated in FIGS. 5A and 5B. Rotation of roller 91 or 95 by a crank 92 or 94 results in replacement of a weathered surface by a fresh fluorescent surface. Such rotation can be effected either manually at appropriate intervals or by a gear drive mechanism powered by an electric motor (not shown) adjusted for a rather slow continuous motion (e.g., 1 meter per day or per week depending on the stability of the fluorescent layer and on ambient weather conditions). Paper roll 87 may be pre-impregnated with fluorescent material and discarded after the entire available fluorescent surface has deteriorated from prolonged exposure to dust, daylight, and/or other weathering effects, whereas the surface of endless belt 93 may be continuously renewed by immersion in a bath 99 comprising a fluorescent paint 101 protected by a cover 103. The fluorescent material in targets 83 is selected according to its fluorescence spectrum. The latter must overlap with the absorption spectra of the measured air pollutants. For instance, to measure the average concentrations of sulfur dioxide, ozone, and nitrogen dioxide between the lidar apparatus and targets 83, the fluorescence spectrum of targets 83 should extend from about 0.28 micron to about 0.4 micron. Such a fluorescence spectrum can be provided by many biological materials, especially by proteins, and especially by the serum albumins of most domestic and other animals (horse, beef, sheep, pig, dog, or rabbit). On the other hand, for measurements of nitrogen dioxide alone the fluorescent spectrum should preferably extend from about 0.35 micron to about 0.5 micron. The latter fluorescence range or major portions thereof can be readily provided by a number of organic substances such as sodium salicylate, anthracene, pyrene, 1,2-benzanthracene, 4-methyl umbelliferone, sodium 3-ethylaminopyrene-5,8, 10-trisulfonate and many others. By comparing the spectra of the radiation returned from the various observed targets 83 with their known fluorescent specturm, one obtains the absorption spectra of the atmosphere between the lidar system and these targets. From the absorption spectra one can estimate the concentrations of those air pollutants which absorb at any of the fluorescence wavelengths, and hence one arrives at the distribution of pollutants around the lidar system.

Each of the targets 83 is protected from direct sunlight by a shield 105. With the field of view of the lidar receiver confined to the target area, and the latter in shadow, any interference from ambient sunlight becomes much less troublesome than it is for lidar systems viewing into the sky. Hence fluorescence measurements at wavelengths in excess of 0.3 micron can be performed from the shaded targets even in daytime without serious difficulty, especially since the fluorescence return is usually much stronger than the aforediscussed Raman backscatter intensities due to atmopshseric oxygen and nitrogen.

For the technique represented by FIG. 3B, the apparatus of either FIG. 1 or of FIG. 2 may be equally suitable. However, the latter can then be greatly simplified, as only one laser wavelength is required to effect the required fluorescence. It may suffice to use a single argon-ion or krypton-ion laser 41 (with a second harmonic generator inside the laser cavity) and to dispense with the other two lasers 42, 43,... (and associated components such as mirrors 46, 47,...). For measurements of nitrogen dioxide alone it may even suffice to excite the fluorescence of targets 83 with a nitrogen laser or with the second harmonic of a ruby laser.

On the other hand, with simple reflective nonfluorescent targets (such as corner reflectors or mirrors) the apparatus of FIG. 2 would require several lasers in order to perform absorption spectroscopic measurements, and such measurements at only a few laser wavelengths could be easily affected by the presence of interfering substances in the atmosphere. Thus by providing return signals over a relatively broad spectral region, the fluorescent targets 83 yield more reliable measurements with simpler and more economical equipment.

The stationary monitoring arrangement of FIG. 3B may be practical in a heavily industrialized area where a number of possible sources of air pollution may be concentrated within a radius of a few kilometers. On the other hand, for more sparsely industrialized areas it may be more practical to use a mobile monitoring system making rounds among the various plants distributed over a larger area. To monitor a single smokestack with equipment mounted on a mobile vehicle the apparatus of FIG. 4 may be appropriate.

FIG. 4 is a schematic representation of a mobile vehicle 107 in which the lidar system is mounted. Optical bench 73 carrying the optical components is aimed at a portion of a plume 109 emitted from a smokestack 111.

The concentrations of the various pollutants in various portions of and around plume 109 can here again be measured by either the Raman or the absorption spectroscopic technique. Since the concentration of the major pollutants at and around the smokestack may be fairly high, their Raman backscatter may yield measurable signals if measured at a relatively short distance (about 150-200 meters). However, strong absorption in the 0.25–0.3 micron range by the various constituents of the plume may severely reduce the backscatter signals and thereby introduce an uncertainty in the measurement of any single pollutant species. This uncertainty can be reduced by comparing the returns due to each pollutant with those due to a standard smokestack constituent such as carbon dioxide. For instance, the rate of carbon dioxide production by a power plant can be estimated from the known rate of fuel consumption. Hence by comparing the Raman returns due to such pollutants as nitric oxide (NO) and sulfur dioxide ($SO_2$) with those due to carbon dioxide it becomes possible to estimate the rates of emission of NO and $SO_2$ from a given stack.

Since the Raman returns due to even relatively high pollutant concentrations are still rather weak, it may here again be advantageous to utilize a fluorescent target 113 behind the plume and to analyze the absorption spectra produced by the various portions of said plume and/or by the surrounding atmosphere. Target 113 may consist of a kite— or umbrella— or saucer-shaped opaque sheet 121 of cloth, paper, plastic or other natural or synthetic polymeric material or of thin metal foil (e.g., of aluminum) whose surfaces 123 are covered by a layer of fluorescent material yielding a known fluorescence spectrum when illuminated by the lidar beam (cf. FIGS. 4 and 5C). Target 113 can be supported at the required level above the plume by a small hydrogen— or helium-filled ballon 115 and held in a desired position by strings 117 and 119 which can be made to pull at either target 113 or ballon 115. By manipulating strings 117 and 119, the inclination of target 113 can be so adjusted that its lower fluorescent surface 123 is facing the lidar system while remaining shielded from the sun by the opaque supporting sheet 121. These manipulations may have to be performed continuously under variable wind conditions and/or when several portions of the plume are to be spectroanalyzed.

While the last-described measurements can be performed with the apparatus of either FIG. 1 or FIG. 2, it is obviously desirable to reduce the duration of these measurements to a minimum. Hence, in the apparatus of FIG. 1, the monochromator 27 with photodetector 29 should be preferably replaced by the polychromator 59 together with the multiple photodetectors 71, 72,... and filters 69, 70,... of FIG. 2 to permit simultaneous measurements at several wavelengths. Alternately a so-called correlation spectrometer or a similar spectroanalyzer might be used to rapidly estimate the concentrations of specific pollutants based on their known specific absorption spectra.

Besides extending the applicability of absorption spectroscopic measurements, targets 83 or 113 may also permit daytime Raman spectroscopic measurements simply by serving as shields against a bright sky background. Hence, if the fluorescence spectrum of said targets does not extend beyond 0.53 micron, it may be possible to perform improved direct Raman measurements on various air pollutants using the 0.53-micron second harmonic of the neodymium glass laser of FIG. 1. Such a procedure may be advantageous in those cases where the opacity of a plume in the 0.25–0.3 micron range may cause excessive attenuation of the lidar Raman return in the latter range. The shield provided by target 113 also eliminates the hazard of eye damage to aircraft passengers or crew, even with the 0.53-micron laser pulses, provided that precautions are taken to have the target intercept the entire laser beam.

Besides their beneficial shielding action, the fluorescent targets 83 or 113 in the foregoing illustrative examples also serve the double purpose of providing return signals over a considerably broader spectral range than would be obtainable with a few laser wavelengths, and of providing stronger return signals than would be obtainable from the Raman backscatter by atmospheric nitrogen and oxygen. The stronger return signals arise from the fact that the fluorescence cross-sections of appropriately selected substances are larger by many orders of magnitude than the Raman-scattering cross-section of air molecules, and also from the much higher density of molecules in the fluorescent layers as compared with the density of air. Of course, retro-reflectors such as those obtainable with corner prisms can yield even stronger return signals at selective laser wavelengths, but such optical components are more expensive to produce and to maintain than the fluorescent targets illustrated in FIG. 5, and in view of their weight, fragility, and directionality they would be far more difficult to manipulate in the application of FIG. 4 than the light, flexible, omnidirectional and inexpensive target 123.

In addition to the foregoing examples, there exist applications where the installation of solid fluorescent targets may be difficult or impractical. Under these conditions it may still be possible to perform improved lidar absorption spectroscopic measurements by producing a fluorescent background in the form of a fluorescent cloud or plume 125 (FIG. 5D) comprising either strongly fluorescent gases or suspended fluorescent solid particles, aerosols or a similar cluster or agglomeration of small air-borne fluorescent particles. Among the fluorescent gases may be mentioned sulfur ($S_2$) or acetaldehyde vapor. Such a cloud can be generated in several ways, e.g., by exploding one or more shells containing the fluorescent material, said shells being fired from a cannon or similar device, or by discharging such material from an aircraft.

There will now be obvious to those skilled in the art many modifications and variations of the aforedisclosed apparatus and methods, which variations will not depart from the scope of my invention if defined by the following claims:

I claim:

1. Remote sensing apparatus comprising a laser transmitter and a receiver, said receiver comprising an optical system for focusing radiation incident thereon onto a spectro-analyser, said spectroanalyser comprising means for measuring the radiation received at several selected wavelengths, said transmitter and receiver being located near each other and so directed that the laser beam from said transmitter approximately coincides with the volume viewed by said receiver, a fluorescent target at a considerable distance from said transmitter and receiver, said target having quantitatively established fluorescence characteristics, and means for aiming the radiation emitted from said transmitter at said fluorescent target.

2. Apparatus as claimed in claim 1 wherein said transmitter transmits radiation in the 0.25–0.3 micron wavelength range.

3. Apparatus as claimed in claim 2, comprising a neodymium type laser with second and fourth harmonic generators yielding radiation of approximately 0.53 micron and 0.265 micron wavelength, respectively.

4. Apparatus as claimed in claim 1 wherein said target fluoresces in the 0.28–0.4 micron range.

5. Apparatus as claimed in claim 1 wherein said target fluoresces in the 0.35–0.5 micron range.

6. Apparatus as claimed in claim 1 wherein the fluorescent material in said target is supported by a sheet-like polymeric substrate.

7. Apparatus as claimed in claim 1 wherein the fluorescent material in said target is supported by metal foil.

8. Apparatus as claimed in claim 1 wherein said target is air-borne.

9. Apparatus as claimed in claim 1 comprising means for generating said target in the form of a cluster of numerous small air-borne fluorescent particles.

10. A method of detecting air pollutants at a distance which comprises: transmitting laser radiation to a fluorescent target, measuring the intensity of the radiation returning from said target at several different wavelengths, and deducing the presence of said pollutants from the attenuation of the radiation which is emitted by said target.

11. A method as claimed in claim 10 wherein said fluorescent target is air-borne.

12. A method as claimed in claim 11 wherein said target is lifted by a ballon and held down by strings which are manipulated to maintain said target in the desired position.

13. A method as claimed in claim 11 comprising generating a cluster of air-borne fluorescent particles at a large distance from said lidar system.

14. A method of remotely detecting sulfur dioxide and ozone which comprises: transmitting laser radiation of at least two distinct wavelengths from a lidar system, at least one of said wavelengths being in the wavelength range of 0.25 to 0.3 micron, measuring the intensity of the radiation returning to said lidar system at several wavelengths which are different than the transmitted wavelengths, some of said different wavelengths arising from the Raman-scattering of the transmitted radiation by at least one major atmospheric constituent, especially nitrogen, and comparing the attenuation of said returning radiation at said different wavelengths.

15. A method as claimed in claim 14 wherein the presence of pollutants is also deduced from an enhancement of said returning radiation at wavelengths corresponding to the Raman-shifted backscatter due to carbon dioxide and water.

16. A method as claimed in claim 15 comprising tracking a pollutant plume to its source by measuring the density of the pollutants along different directions and following along the direction of highest pollutant density.

* * * * *